United States Patent
von Waldkirch et al.

(10) Patent No.: US 8,011,240 B2
(45) Date of Patent: Sep. 6, 2011

(54) FLOW SENSOR WITH THERMOCOUPLES

(75) Inventors: Marc von Waldkirch, Zollikon (CH);
Mark Hornung, Männedorf (DE); **Felix
Mayer, Stäfa (CH); Moritz Lechner**,
Stäfa (CH)

(73) Assignee: Sensirion AG, Stäfa (CH)

( * ) Notice: Subject to any disclaimer, the term of this patent is extended or adjusted under 35 U.S.C. 154(b) by 774 days.

(21) Appl. No.: 11/729,025

(22) Filed: Mar. 27, 2007

(65) Prior Publication Data
US 2007/0241093 A1     Oct. 18, 2007

(30) Foreign Application Priority Data
Mar. 31, 2006 (EP) ..................... 06006933

(51) Int. Cl.
*G01F 1/68* (2006.01)
*H05B 1/00* (2006.01)

(52) U.S. Cl. .................... 73/204.26; 219/201

(58) Field of Classification Search .......... 219/384, 219/385, 538, 201; 392/465, 466, 467, 468, 392/469, 470, 471, 472, 473, 474, 475, 476, 392/477, 478, 479, 480, 481, 482, 483, 484, 392/485; 73/204.24, 204.25, 204.26, 204.23, 73/204.19
See application file for complete search history.

(56) References Cited

U.S. PATENT DOCUMENTS

| | | | |
|---|---|---|---|
| 3,042,786 A * | 7/1962 | Babcock et al. | ........... 219/50 |
| 4,373,386 A | 2/1983 | Schuddemat et al. | |
| RE31,906 E | 6/1985 | Oyama et al. | |
| 4,587,843 A | 5/1986 | Tokura et al. | |
| 4,651,564 A * | 3/1987 | Johnson et al. | ........... 73/204.26 |
| 4,672,997 A * | 6/1987 | Landis et al. | ........... 137/554 |
| 4,784,721 A | 11/1988 | Holman et al. | |
| 4,884,443 A | 12/1989 | Lee et al. | |
| 5,233,868 A | 8/1993 | Coats et al. | |
| 5,288,147 A * | 2/1994 | Schaefer et al. | ........... 374/10 |
| 5,321,983 A | 6/1994 | Nagata et al. | |
| 5,393,351 A * | 2/1995 | Kinard et al. | ........... 136/225 |
| 5,596,219 A * | 1/1997 | Hierold | ........... 257/467 |
| 5,705,745 A | 1/1998 | Treutler et al. | |
| 5,763,775 A | 6/1998 | Sato et al. | |

(Continued)

FOREIGN PATENT DOCUMENTS

DE        10129300        6/2000

(Continued)

OTHER PUBLICATIONS

XP000689255, F. Mayer et al. "Scaling of Thermal CMOS Gas Flow Microsensor: Experiment and Simulation", pp. 116-121, IEEE Catalog No. 96CH35856 ISSN 1084-6999, 1996.

(Continued)

*Primary Examiner* — Henry Yuen
*Assistant Examiner* — Hemant Mathew
(74) *Attorney, Agent, or Firm* — Cooper & Dunham LLP

(57) ABSTRACT

The flow sensor comprises a heater arranged between two sensing thermopiles. In addition, at least one monitoring thermocouple is provided for measuring the temperature of the heater. The signal from the monitoring thermocouple can be used to improve the accuracy of the device in several ways. In particular, the signal from the monitoring thermocouple depends on changes of the Seeback constant and other inherent properties of the thermopiles in the same way as the signal from the sensing thermopiles, which allows a compensation of such effects. The signal from the monitoring thermocouple can also be used as a reference voltage to an A/D converter for converting the signals from the sensing thermopiles.

17 Claims, 5 Drawing Sheets

U.S. PATENT DOCUMENTS

| | | | |
|---|---|---|---|
| 5,804,720 A | 9/1998 | Morimasa et al. | |
| 5,830,372 A | 11/1998 | Hierold | |
| 5,965,811 A | 10/1999 | Kawai et al. | |
| 6,035,711 A * | 3/2000 | Huijsing et al. | 73/202.5 |
| 6,209,402 B1 | 4/2001 | Yamada et al. | |
| 6,349,596 B1 | 2/2002 | Nakada et al. | |
| 6,378,365 B1 * | 4/2002 | Tu | 73/204.26 |
| 6,460,411 B1 | 10/2002 | Kersjes et al. | |
| 6,550,324 B1 | 4/2003 | Mayer et al. | |
| 6,550,325 B1 | 4/2003 | Inushima et al. | |
| 6,615,655 B1 | 9/2003 | Sakai et al. | |
| 6,631,638 B2 * | 10/2003 | James et al. | 73/204.26 |
| 6,662,121 B1 | 12/2003 | Oda et al. | |
| 6,684,694 B2 * | 2/2004 | Fujiwara et al. | 73/204.26 |
| 6,871,538 B2 * | 3/2005 | Fujiwara et al. | 73/204.26 |
| 6,920,786 B2 | 7/2005 | Mayer et al. | |
| 6,945,106 B2 * | 9/2005 | Lotters | 73/204.26 |
| 7,490,511 B2 * | 2/2009 | Mayer et al. | 73/204.15 |
| 2002/0043104 A1 * | 4/2002 | Lammerink | 73/204.15 |
| 2003/0115952 A1 | 6/2003 | Mayer et al. | |
| 2003/0152128 A1 * | 8/2003 | Verhaegen | 374/30 |
| 2004/0000196 A1 | 1/2004 | Kleinlogel et al. | |
| 2004/0163464 A1 * | 8/2004 | Nakada et al. | 73/204.26 |

FOREIGN PATENT DOCUMENTS

| | | |
|---|---|---|
| EP | 0698786 | 2/1996 |
| EP | 1065475 | 1/2001 |
| WO | WO0118500 | 3/2001 |

OTHER PUBLICATIONS

XP000700816, SPIE vol. 1793, Integrated Optics and Microstructures (1992) "Silicon Integrated Microsensros", Khalil Najafi.

IEEE Catalog No. 97CH36021, F. Mayer et al., Flip-Chippacking for Thermal CMOS Anemometers.

IEEE International Electron Devices Meeting, (IEDM, 1997) 895-898 (97CH36103) Single-Chip CMOS Anemometer, F. Mayer et al.

Tranducers '95 Digest of Technical Papers, vol. 1, (1995) 528-531, F. Mayer et al., Influence of Design Geometry and Packaging on the Response of Thermal CMOS Flow Sensors.

* cited by examiner

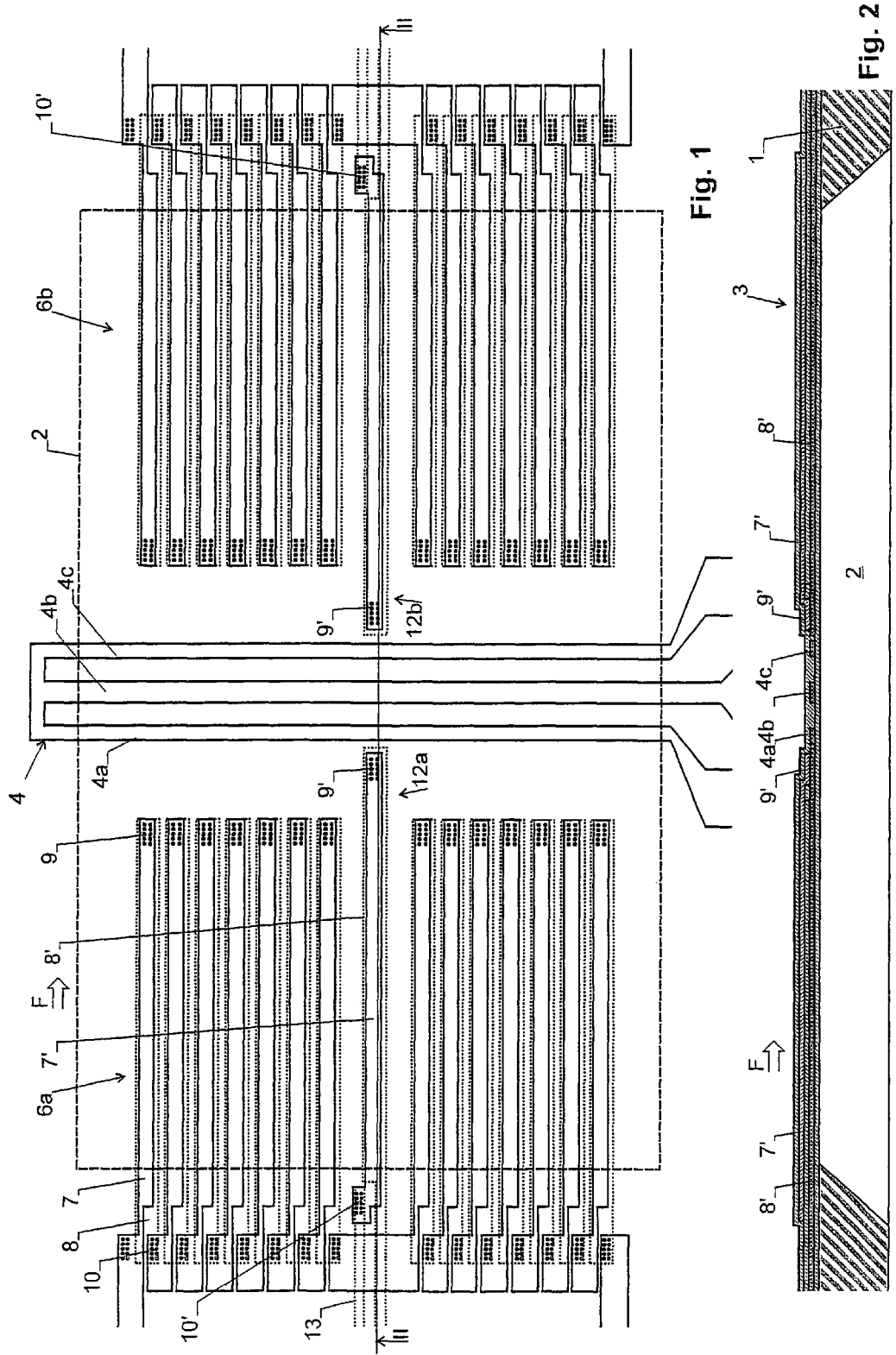

FLOW SENSOR WITH THERMOCOUPLES

CROSS REFERENCE TO RELATED APPLICATIONS

This application claims the priority of European patent application 06006933.3, filed Mar. 31, 2006, the disclosure of which is incorporated herein by reference in its entirety.

BACKGROUND OF THE INVENTION

The invention relates to a device for measuring the flow of a fluid that has a heater and at least two sensing thermopiles integrated on a substrate, in particular a semiconductor substrate. The device is adapted to measure the flow of the fluid from the signal measured by the sensing thermopiles. This type of flow sensor is e.g. described in US 2003/0115952.

BRIEF SUMMARY OF THE INVENTION

It is an object of the present invention to provide means for improving the accuracy of such a device.

Now, in order to implement these and still further objects of the invention, which will become more readily apparent as the description proceeds, the device for measuring the flow of a fluid according to a first aspect of the present invention comprises: a substrate; a heater arranged on said substrate; at least one first and one second sensing thermopile for measuring a temperature difference between a location upstream and a location downstream of said heater and for generating a sensing signal, which sensing thermopiles are arranged on said substrate, wherein a junction of said sensing thermopiles closest to said heater is arranged at a first distance from said heater; at least a first and a second monitoring thermocouple arranged upstream and down-stream from said heater for generating a monitoring signal, which monitoring thermocouples are arranged on said substrate, wherein a junction of said monitoring thermocouples closest to said heater is arranged at a second distance from said heater, wherein said second distance is smaller than said first distance; and a control circuit adapted to measure a flow of the fluid over said heater and said sensing thermopiles from a flow-dependent heating of said sensing thermopiles by said heater.

Accordingly, at least one monitoring thermocouple for generating a monitoring signal is provided on the substrate. One junction of the monitoring thermocouple is closer to the heater than any junction of the sensing thermopiles. The monitoring thermopiles arranged at opposite sides of the heater, one of them being located upstream of the heater and the other downstream of the heater.

The sensing signal can be used to improve the accuracy of the device in several ways as described in the following.

In one advantageous embodiment, the device comprises means for generating a signal proportional to the ratio of the sensing signal and the monitoring signal. Such a signal is less dependent on the Seeback constant and other inherent properties of the thermocouples.

In another advantageous embodiment, the device can be equipped with a control loop controlling the current through the heater in such a way that the monitoring signal is kept constant. Even though the heating control described in US 2003/0115952 achieves a very similar effect, it must be noted that the heater temperatures measured in that device is derived from the temperature dependent resistivity of the heater, i.e. the inherent correction for changes of the Seeback constant and other inherent thermocouple properties described above is not achieved in that prior art.

In another aspect, the invention relates to a device for measuring the flow of a fluid comprising: a substrate, wherein said substrate is divided into a measuring region and a regular region, wherein a thermal conductance in said measuring region is lower than a thermal conductance in said regular region; a heater arranged at least partially on said measuring region; at least one sensing thermocouple for generating a sensing signal, which sensing thermocouple is arranged at least partially on said measuring region, wherein a junction of said sensing thermocouple closest to said heater is arranged at a first distance from said heater; a control circuit adapted to measure a flow of the fluid over said heater and said sensing-thermocouple from a flow-dependent heating of said sensing thermocouple by said heater; and at least one monitoring thermocouple for generating a monitoring signal, which monitoring thermocouple is arranged completely on said measuring-region, wherein a junction of said monitoring thermocouple closest to said heater is arranged at a second distance from said heater, wherein said second distance is smaller than said first distance.

In yet another aspect, the invention relates to a device for measuring the flow of a fluid comprising: a substrate; a heater arranged on said substrate, wherein said heater comprises several conductors with at least one gap between said conductors; at least one sensing thermocouple for generating a sensing signal, which sensing thermocouple is arranged on said substrate, wherein a junction of said sensing thermocouple closest to said heater is arranged at a first distance from said heater; a control circuit adapted to measure a flow of the fluid over said heater and said sensing thermocouple from a flow-dependent heating of said sensing thermocouple by said heater; and a plurality of monitoring thermocouples for generating a monitoring signal, which monitoring thermocouples are arranged in said gap and comprise a first bar of a first material extending from a first end of said heater to a center of said heater and a second bar of a second material connected at said center of said heater to said first bar and extending to a second end of said heater.

In a final aspect, the invention relates to a device for measuring the flow of a fluid comprising: a substrate; a heater arranged on said substrate; at least one sensing thermocouple for generating a sensing signal, which sensing thermocouple is arranged on said substrate, wherein a junction of said sensing thermocouple closest to said heater is arranged at a first distance from said heater; a control circuit adapted to measure a flow of the fluid over said heater and said sensing thermocouple from a flow-dependent heating of said sensing thermocouple by said heater; at least one monitoring thermocouple for generating a monitoring signal, wherein said monitoring thermocouple is arranged on said substrate, wherein a junction of said monitoring thermocouple closest to said heater is arranged at a second distance from said heater, wherein said second distance is smaller than said first distance; and an analog/digital converter for converting said sensing signal, wherein said analog/digital converter has a reference input and generates a digitized value of said sensing signal normalized by a signal at said reference input, wherein said monitoring signal is applied to said reference input.

The advantages of this aspect are two-fold. First, the digitized signal corresponds to the ratio of the sensing signal and the monitoring signal, with the advantageous consequences mentioned above. Second, the resolution of the converter is decreased at low flows (where the monitoring signal is large), while it is increased at high flows (where the monitoring signal is small)—this is advantageous because the dependence of the sensing signal on the flow decreases with increasing flow.

BRIEF DESCRIPTION OF THE DRAWINGS

The invention will be better understood and objects other than those set forth above will become apparent when consideration is given to the following detailed description thereof. Such description makes reference to the annexed drawings, wherein:

FIG. 1 is a top view of a first embodiment of a flow sensor,
FIG. 2 is a schematic sectional view along line II-II of FIG. 1.

DETAILED DESCRIPTION OF THE INVENTION

Figure 3:
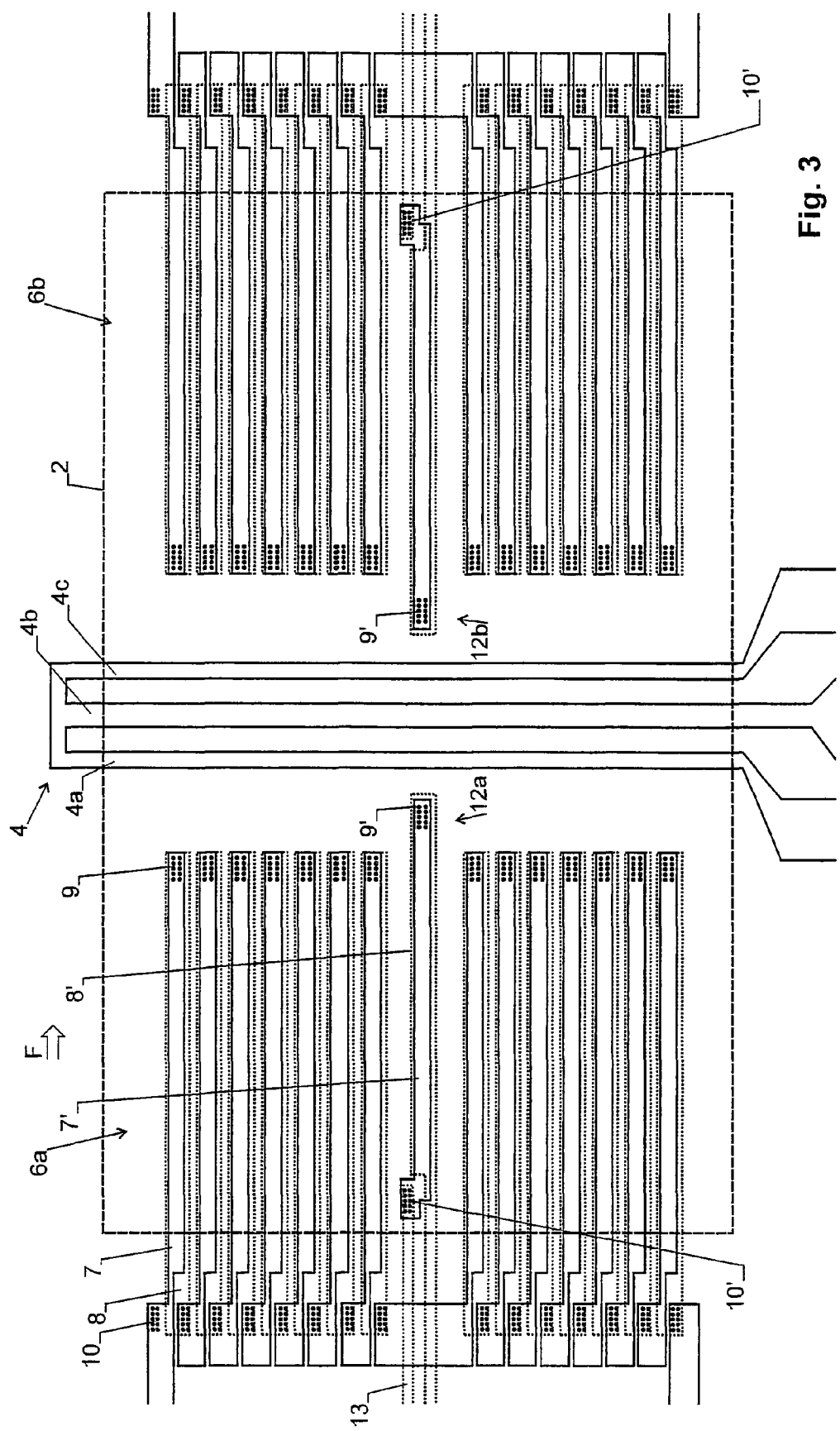
FIG. 3 is a top view of a second embodiment.

The device of FIGS. 1 and 2 is designed as a semiconductor chip based on a silicon substrate 1, even though another semiconductor or dielectric substrate could be used as well, such as a glass substrate. A recess or opening 2 has been formed in substrate 1 by etching techniques and is spanned by a membrane 3. A heater 4 extends over membrane 3. In the embodiment of FIGS. 1 and 2, heater 4 is formed by three parallel conductors 4a, 4b, 4c, the two outer conductors 4a, 4c being arranged, electrically, in parallel, while the center conductor 4b (having double cross section) is in series to the conductors 4a, 4c.

Two sensing thermopiles 6a and 6b, each consisting of a plurality of thermocouples in series, are arranged upstream and downstream of heater 4 (the terms "upstream" and "downstream" being defined in respect to a flow direction F perpendicular to the longitudinal axis of the heater). Each sensing thermocouple consists of a metal bar 7 (shown in continuous lines in FIG. 1) formed in a metal layer of the integrated circuit as well as a polysilicon bar 8 (shown in dotted liens in FIG. 1) formed in the polysilicon layer of the integrated circuit. The metal and polysilicon bars 7, 8 of each thermocouple are interconnected at a first junction 9 on membrane 3. The polysilicon and metal bars 8, 7 of two neighboring thermocouples are interconnected at a second junction 10, which second junction 10 is not located on membrane 3, but over the bulk of substrate 1.

The basic principle of operation of such a device is e.g. described in US 2003/0115952. A flow along flow direction F causes the distribution of heat from heater 4 to become asymmetric, which creates a difference of temperature at the first junctions 9 of the two thermopiles 6a, 6b. At the same time, the second junctions 10 remain at substantially constant temperatures due to the heat exchange through the thermally conducting substrate 1. Hence, the difference of the voltages from the thermopiles 6a, 6b (or any value proportional thereto), which is called the "sensing signal" in the following, is substantially a measure of the temperature difference $\Delta T$ at the first junctions 9 upstream and downstream of heater 4. This temperature difference $\Delta T$ is a measure of the mass flow of the fluid.

As can be seen in FIGS. 1 and 2, two additional monitoring thermocouples 12a, 12b are provided on the device, each of which is located approximately at the center of one of the sensing thermopiles 6a, 6b. As can be clearly seen from FIG. 1, one monitoring thermocouple is arranged upstream of heater 4 and the other downstream thereof. Each monitoring thermocouple 12a, 12b again consists of a metal bar 7' and a polysilicon bar 8' interconnected at a first junction 9' located over membrane 3. The first junctions 9' of the monitoring thermocouples 12a, 12b are located much closer to heater 4 than the first junctions 9 of the sensing thermopiles 6a, 6b and have a temperature substantially corresponding to the temperature in heater 4. The second ends of the metal bars 7' are e.g. connected to a polysilicon lead 13 at a second junction 10'. The second junctions 10' are, in the embodiment of FIGS. 1 and 2, located over the bulk of substrate 1.

Each monitoring thermocouple 12a, 12b therefore generates a voltage substantially equal to the temperature difference between substrate 1 and heater 4. The voltages from the monitoring thermocouples 12a, 12b are added to generate a monitoring signal TP.

Figure 5:
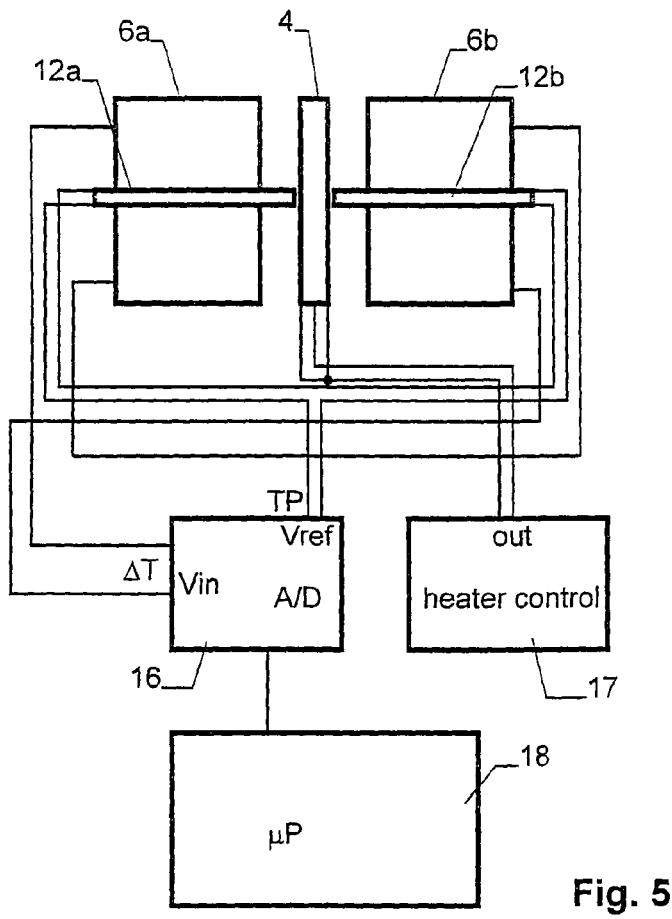
FIG. 5 is a block diagram of a first embodiment of the circuitry of the device.

An embodiment of the circuitry of the device is shown in FIG. 5. It comprises an A/D-converter 16 for digitizing the sensing signal $\Delta T$, a heater control 17 for controlling the current through heater 4 and a microcontroller 18 for processing the digitized sensing signal and controlling the device. Advantageously, the circuitry for all the elements 16, 17 and 18 is integrated on substrate 1, but it can also be formed at least in part by external components.

Basically, A/D-converter 16 can be any type, such as a successive-approximation ADC, a delta-encoded ADC or a sigma-delta converter. All such converter designs require a reference voltage Vref and generate a digitized value of the input signal-normalized by Vref. The term "normalized", in this context, is to be understood such that the output value for a given input voltage depends linearly on the reciprocal value 1/Vref.

Advantageously, A/D-converter 16 is a sigma-delta converter, such as it is e.g. disclosed in DE 101 29 300. The description of the section "A/D-Wandler" and its associated figure of that document are incorporated herein by reference.

As can be seen in FIG. 5, the monitoring signal TP is fed to the reference input of A/D-converter 16 as a reference voltage Vref. The purpose of this measure is described below.

Heater control 17 of the embodiment of FIG. 5 regulates the power dissipated by heater 4 to a constant value. Alternatively, it regulates the current through heater 4 to a constant value.

Figure 6:
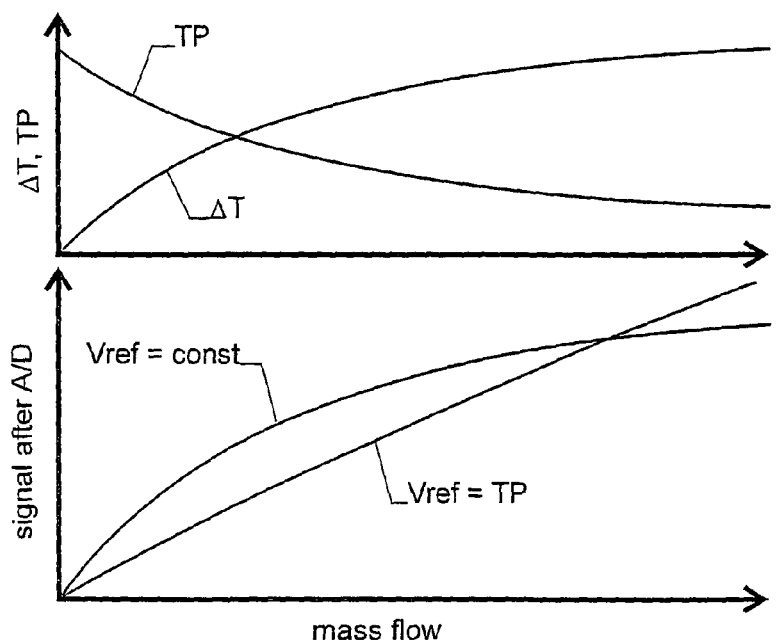
FIG. 6 illustrates the sensing signal $\Delta T$, the monitoring signal TP, and the digitized value of the sensing signal as a function of mass flow with constant and non-constant Vref input.

The dependence of the temperature difference $\Delta T$ as a function of flow v is shown in the upper graph of FIG. 6. For zero flow, $\Delta T=0$. With increasing flow, $\Delta T$ will start to rise linearly. At larger flows, however, the temperature of heater 4 (and therefore the monitoring signal TP) will decrease substantially because of the cooling effect that the passing fluid has on heater 4. Hence, for increasing flows v, the slope of the curve $\Delta T(v)$ will decrease as shown in the upper graph of FIG. 6.

If Vref of A/D-converter 16 were constant, the digitized value from A/D converter 16 would follow the curve "Vref=const" of the lower graph of FIG. 6. As will be understood by those skilled in the art, this will cause a decrease of measurement resolution for larger mass flows v because the resolution of the A/D-converter does not change over its range of input voltages.

However, as mentioned above, Vref is not constant, but rather it is set to the monitoring signal TP. Hence, the resolution of the A/D-converter will be coarser when the heater temperature is high, while the resolution will be finer when the heater temperature is low. This leads to a linearization of the digitized signal at the output of A/D-converter 16 as indicated by the curve "Vref=TP" in the bottom graph of FIG. 6.

Hence, using the monitoring signal TP as a reference voltage Vref allows to obtain a more constant digitization resolution over a wider range of mass flows, which in turn allows an increased accuracy of measurement and/or it allows to decrease the bit resolution of the A/D-converter.

At the same time, since the digitized value has been normalized by Vref, is proportional to the ratio $\Delta T$:TP. Therefore, variations of the Seeback coefficient or of other parameters of the used thermocouples tend to be compensated. Such variations can e.g. be observed when the overall temperature of the device changes, or when membrane 3 is subjected to stress.

In view of this it will become apparent that the design of FIG. 1 has a further advantage: The monitoring thermocouples 12a, 12b are parallel and close to the corresponding thermocouples of the sensing thermopiles 6a, 6b, therefore a strain in membrane 2 will affect both the thermocouples 12a, 12b as well as the thermopiles 6a, 6b in similar manner and will therefore be eliminated in the output value of A/D-converter 16.

Figure 7:
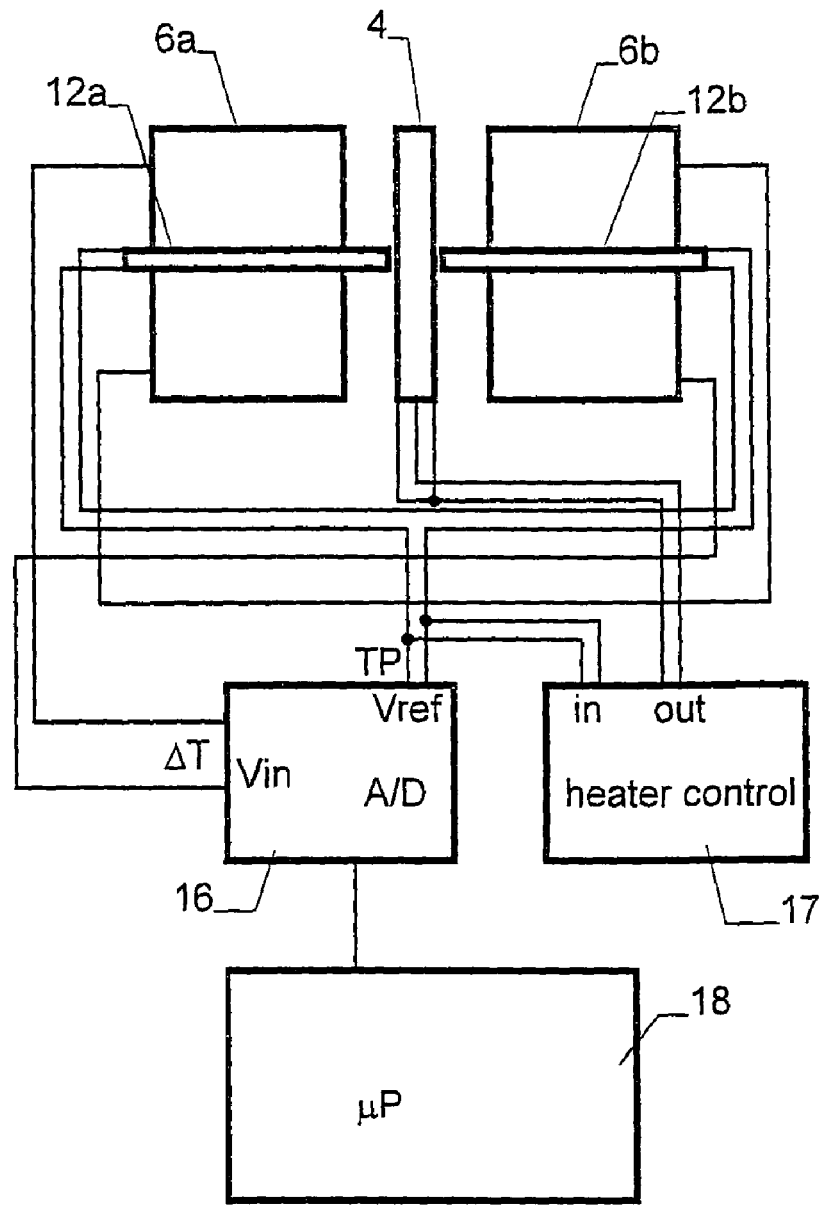
FIG. 7 is a block diagram of a second embodiment of the circuitry of the device.

FIG. 7 shows an alternative circuit design for the flow sensor. It differs from the one of FIG. 6 in that the monitoring signal TP is used as an input to heater control 17. In this embodiment, heater control 17 forms a control loop that controls the current through heater 4 in such a way that the value of the monitoring signal TP remains constant. Since the monitoring signal TP substantially corresponds to the temperature difference between the bulk substrate 1 and heater 4, this embodiment keeps this temperature difference substantially constant.

In that case, sensing signal $\Delta T$ is substantially linear to mass flow v. Hence, a constant voltage could be used as reference voltage for A/D-converter Vref. However, in order to compensate for residual fluctuations of monitoring signal TP, it is still advantageous to use TP as reference voltage Vref.

FIG. 3 shows an alternative design of the monitoring thermocouples 12a, 12b. It differs from the one of FIG. 1 in that the second junctions 10' (and therefore the whole monitoring thermocouples) are now located over membrane 3 and not over the bulk of substrate 1. This has the advantage that the monitoring thermocouples 12a, 12b can follow a change of temperature of heater 4 more quickly and more accurately.

Figure 4:
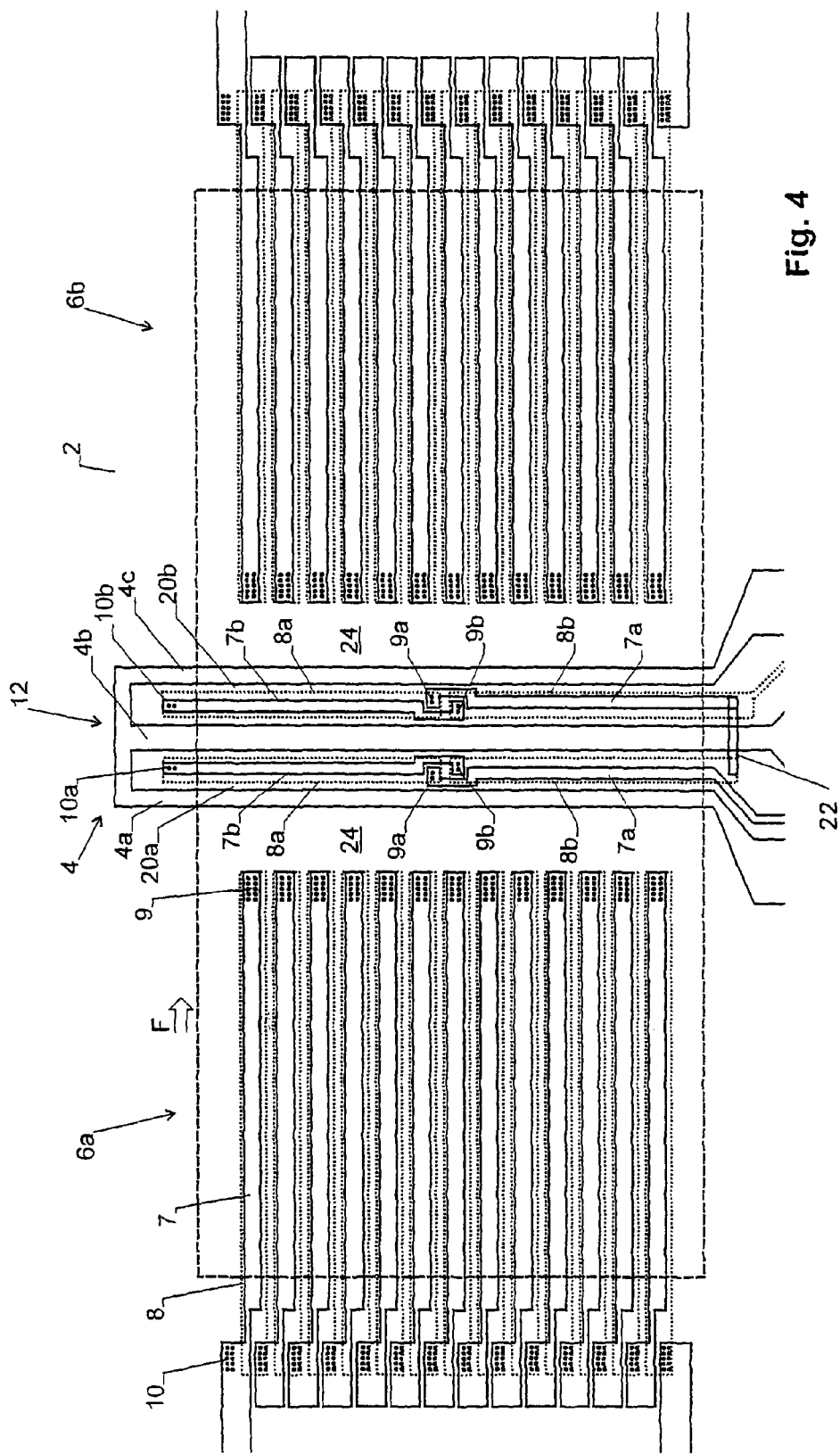
FIG. 4 is a top view of a third embodiment.

A further embodiment of the monitoring thermocouples 12a, 12b is shown in FIG. 4. Here, four monitoring thermocouples form a monitoring thermopile 12 and are arranged in the gaps 20a, 20b between the conductors 4a, 4b and 4c of heater 4. Monitoring thermopile extends parallel to the longitudinal axis of heater 4.

Monitoring thermopile 12 consists of two subunits, each of which is built as follows: A first bar 7a of a first material, namely metal, extends from a first end of heater 4 to the center of the same. A second bar 8a of a second material, namely polysilicon, extends from a junction 9a with first bar 7a to the second end of heater 4, where it ends in a junction 10a. A third bar 7b of the first material is connected to junction 10a and extends back to the center of heater 4, where it ends in a third junction 9b. A fourth bar 8b of the second material extends from junction 9b to the first end of heater 4. The same design is repeated by the sub-unit in the second gap 20b. Each sub-unit measures the difference between the temperature over bulk substrate 1 and the temperature at the center of heater 4. The two-subunits are connected in series via a bridge 22 for adding their voltage.

The design of FIG. 4 has the advantage that the monitoring signal TP follows the temperature of heater 4 more closely. In addition, heat conducting metal or polysilicon leads in the gaps 24 between heater 4 and the sensing thermopiles 6a, 6b are avoided, which decreases undesired heat conduction between these components through membrane 3.

In the embodiments described so far, membrane 3 forms a "measuring region" in contrast to the remaining "regular region" of the chip surface supported by bulk substrate 1. The measuring region has much lower heat conductance between the components located thereon than the regular region. At least part of each, the heater 4, the sensing thermopiles 6a, 6b and the monitoring thermocouples, should be located on the measuring region. As it is known to the person skilled in the art, membrane 3 can be replaced by various other "membrane structures", where the term "membrane structure" describes any thin structure arranged over the opening or recess 2 in the semiconductor chip. The membrane structure can either be formed by a membrane completely closing the opening or recess in the chip, or by a bridge or tongue extending over or into the opening or recess.

Instead of using a recess or opening 2, the measuring region could also be located on top of a layer of material having low thermal conductivity, such as a nanoporous silicon oxide.

The embodiments shown so far comprise two sensing thermopiles arranged upstream and downstream from heater 4. It must be noted, though, that a single thermopile can be used, which is e.g. located downstream from the heater, in particular if the device is designed to measure flow in one direction only, or which extends between junctions upstream and downstream of the heater.

Similarly, the sensing thermocouples of the above embodiments are arranged symmetrically in respect to the longitudinal axis of heater 4. In particular if the device is designed to measure flow in one direction only, a non-symmetric design can be used as well.

Advantageously, a design of the thermocouples that is substantially symmetric to a line extending along flow direction F through the center of heater 4 should be used. This allows to correct for asymmetries when positioning the device. For example, in the embodiment of FIGS. 1 and 3, a monitoring thermocouple 12a, 12b is located at the center of each of the sensing thermopiles 6a, 6b. Alternatively, two (or more) monitoring thermocouples could be provided for each sensing thermopile 6a, 6b distributed symmetrically, e.g. one monitoring thermocouple at each end of each thermopile.

Even though, in the embodiments shown so far, most temperature sensors were thermopiles consisting of a plurality of thermocouples in series, it must be noted that some or all of them may be replaced by single thermocouples (or vice versa) depending on desired signal voltages and available space.

In the embodiment of FIGS. 5 and 7, the ratio $\Delta T$:TP was calculated prior or during analog digital conversion. However, this ratio can also be calculated numerically in microcontroller 18 if the monitoring value TP is digitized as well.

It must be noted that in the embodiments described above, each thermocouple used in the various thermopiles or alone consists of two conductors consisting of a first and a second material, respectively. Advantageously, the same materials are used for all thermocouples in order to profit from a shared Seeback coefficient. Advantageously, one material is a polysilicon and the other a metal, such as aluminum, both being materials conventionally used in integrated circuit technology. In addition, and again in order to have thermocouples with uniform properties, all conductors of the thermocouples should be manufactured from a the same two layers deposited on the substrate, e.g. one being a polysilicon layer and the other a metal layer.

While there are shown and described presently preferred embodiments of the invention, it is to be distinctly understood that the invention is not limited thereto but may be otherwise variously embodied and practiced within the scope of the following claims.

The invention claimed is:

1. A device for measuring a flow of a fluid comprising:
   a substrate,
   a heater arranged on said substrate,
   at least one first and one second sensing thermopile for measuring a temperature difference between a location upstream and a location downstream of said heater and for generating a sensing signal, said sensing thermopiles being arranged on said substrate, wherein a junction of said sensing thermopiles closest to said heater is arranged at a first distance from said heater,
   in addition to and distinct from the first and the second sensing thermopile at least a first and a second monitoring thermocouple arranged upstream and downstream from said heater for generating a monitoring signal, said monitoring thermocouples being arranged on said substrate, wherein a junction of said monitoring thermocouples closest to said heater is arranged at a second distance from said heater, wherein said second distance is smaller than said first distance, and
   a control circuit adapted to measure the flow of the fluid over said heater and said sensing thermopiles from a flow-dependent heating of said sensing thermopiles by said heater,
   wherein said sensing thermopiles extend parallel to said monitoring thermocouples.

2. The device of claim 1 further comprising means for generating a signal proportional to a ratio of said sensing signal and said monitoring signal.

3. The device of claim 1 wherein said sensing signal is proportional to said temperature difference.

4. The device of claim 3 wherein the monitoring signal corresponds to a sum of voltages from the first and the second monitoring thermocouple.

5. The device of claim 1 wherein said substrate is divided into a measuring region and a regular region, wherein a thermal conductance in said measuring region is lower than a thermal conductance in said regular region, and wherein said heater, said sensing thermopiles and said monitoring thermocouples are arranged at least partially on said measuring region.

6. The device of claim 5 wherein some junctions of each of said first and said second sensing thermopiles are arranged on said regular region.

7. The device claim 5 wherein a first junction of each of said monitoring thermocouples is arranged on said measuring region and a second junction of each of said monitoring thermocouples is arranged on said regular region.

8. The device of claim 5 wherein a both junctions of each of said monitoring, thermocouples are arranged on said measuring region.

9. The device of claim 5 comprising a hole or recess in said substrate and a membrane structure extending over said hole or recess, wherein said measuring region is defined by said membrane structure.

10. The device of claim 1 further comprising a control loop controlling a current through said heater in order to keep said monitoring signal constant.

11. The device of claim 1 further comprising an analog/digital converter for converting said sensing signal, wherein said analog/digital converter has a reference input and generates a digitized value of said sensing signal normalized by a signal at said reference input, wherein said monitoring signal is applied to said reference input.

12. The device of claim 1 wherein said monitoring thermocouples are arranged symmetrically in respect to a longitudinal axis of said heater.

13. The device of claim 1 wherein the junction of said monitoring thermocouples closest to said heater is adapted to measure a temperature of said heater.

14. A device for measuring a flow of a fluid comprising
   a substrate, wherein said substrate is divided into a measuring region and a regular region, wherein a thermal conductance in said measuring region is lower than a thermal conductance in said regular region,
   a heater arranged at least partially on said measuring region,
   at least one sensing thermocouple for generating a sensing signal, said sensing thermocouple being arranged at least partially on said measuring region, wherein a junction of said sensing thermocouple closest to said heater is arranged at a first distance from said heater,
   a control circuit adapted to measure the flow of the fluid over said heater and said sensing thermocouple from a flow-dependent heating of said sensing thermocouple by said heater, and
   in addition to and distinct from the sensing thermocouple at least one monitoring thermocouple for generating a monitoring signal, said monitoring thermocouple being arranged completely on said measuring region, wherein a junction of said monitoring thermocouple closest to said heater is arranged at a second distance from said heater, wherein said second distance is smaller than said first distance, wherein said sensing thermocouple extends parallel to said monitoring thermocouple.

15. A device for measuring a flow of a fluid comprising
   a substrate,
   a heater arranged on said substrate, wherein said heater comprises several conductors with at least one gap between said conductors,
   at least one sensing thermocouple for generating a sensing signal, said sensing thermocouple being arranged on said substrate, wherein a junction of said sensing thermocouple closest to said heater is arranged at a first distance from said heater,
   a control circuit adapted to measure the flow of the fluid over said heater and said sensing thermocouple from a flow-dependent heating of said sensing thermocouple by said heater, and
   in addition to and distinct from the sensing thermocouple a plurality of monitoring thermocouples for generating a monitoring signal, said monitoring thermocouples being arranged in said gap and comprising a first bar of a first material extending from a first end of said heater to a center of said heater and a second bar of a second material connected at said center of said heater to said first bar and extending to a second end of said heater.

16. The device of claim 15 further comprising a third bar of said first material being connected to said second bar at said second end and extending to said center and a fourth bar of said second material being connected to said third bar at said center and extending to said first end.

17. A device for measuring a flow of a fluid comprising
   a substrate,
   a heater arranged on said substrate,
   at least one sensing thermocouple for generating a sensing signal, said sensing thermocouple being arranged on said substrate, wherein a junction of said sensing thermocouple closest to said heater is arranged at a first distance from said heater, a control circuit adapted to measure the flow of the fluid over said heater and said sensing thermocouple from a flow-dependent heating of said sensing thermocouple by said heater, in addition to and distinct from the sensing thermocouple at least one monitoring thermocouple for generating a monitoring signal, wherein said monitoring thermocouple is arranged on said substrate, wherein a junction of said monitoring thermocouple closest to said heater is arranged at a second distance from said heater, wherein said second distance is smaller than said first distance and an analog/digital converter for converting said sensing signal, wherein said analog/digital converter has a reference input and generates a digitized value of said sensing signal normalized by a signal at said reference input, wherein said monitoring signal is applied to said reference input.

* * * * *